US009569676B2

(12) United States Patent
Yesugade et al.

(10) Patent No.: US 9,569,676 B2
(45) Date of Patent: Feb. 14, 2017

(54) COMPUTER IMPLEMENTED SYSTEM AND METHOD FOR EXTRACTING AND RECOGNIZING ALPHANUMERIC CHARACTERS FROM TRAFFIC SIGNS

(71) Applicant: Tata Consultancy Services Ltd., Mumbai, Maharashtra (IN)

(72) Inventors: Snehal Yesugade, Bangalore (IN); Mukesh Holani, Bangalore (IN); Saikat Kundu, Bangalore (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 0 days.

(21) Appl. No.: 14/721,385

(22) Filed: May 26, 2015

(65) Prior Publication Data

US 2016/0224851 A1 Aug. 4, 2016

(30) Foreign Application Priority Data

Jan. 31, 2015 (IN) .......................... 326/MUM/2015

(51) Int. Cl.
*G06K 9/00* (2006.01)
*G06K 9/46* (2006.01)
(Continued)

(52) U.S. Cl.
CPC ............ *G06K 9/00818* (2013.01); *G06K 9/00* (2013.01); *G06K 9/18* (2013.01); *G06K 9/46* (2013.01);
(Continued)

(58) Field of Classification Search
None
See application file for complete search history.

(56) References Cited

U.S. PATENT DOCUMENTS 6,363,161 B2 * 3/2002 Laumeyer ..................... 382/104
6,449,384 B2 * 9/2002 Laumeyer .......... G06K 9/00818
382/104
(Continued)

FOREIGN PATENT DOCUMENTS

CN 101706873 B 5/2012

OTHER PUBLICATIONS

Al Rababaa, et al., "Multifonts Numeral Recognition using Hybrid Technique," International Journal of Computer Applications 82(14):Nov. 1-13, 2013.
(Continued)

*Primary Examiner* — Tsung-Yin Tsai
(74) *Attorney, Agent, or Firm* — Robert Plotkin, P.C.; Robert Plotkin (57) ABSTRACT

A computer implemented system and method for extracting and recognizing alphanumeric characters from traffic signs is envisaged. A camera present in the system is adapted to be mounted on the vehicle for capturing images of traffic signs. The system then gives a region of interest (ROI) within the frame of the captured image, from where the alphanumeric characters are extracted and enhanced for recognition. For recognizing the enhanced alphanumeric characters, the image is converted to binary image and morphological thinning technique is applied on it. The space then obtained between two alphanumeric characters thus helps in extracting the characters and recognizing them independently from the captured image. For each extracted alphanumeric character is re-sized to a specified size and is recognized with the help of white pixels count. Once the alphanumeric characters are recognized they are displayed on a display.

12 Claims, 5 Drawing Sheets

(51) Int. Cl.
*G06K 9/18* (2006.01)
*G06K 9/52* (2006.01)
*G06T 3/40* (2006.01)
*G06K 9/32* (2006.01)
*G06K 9/44* (2006.01)

(52) U.S. Cl.
CPC ............... *G06K 9/4642* (2013.01); *G06K 9/52* (2013.01); *G06T 3/40* (2013.01); *G06K 9/3241* (2013.01); *G06K 9/44* (2013.01); *G06K 2009/4666* (2013.01); *G06K 2209/01* (2013.01)

(56) References Cited

U.S. PATENT DOCUMENTS

| | | | | |
|---|---|---|---|---|
| 7,274,311 | B1* | 9/2007 | MacLeod | G06T 13/00 340/995.13 |
| 8,320,629 | B2 | 11/2012 | Hofman et al. | |
| 8,483,951 | B2* | 7/2013 | Shih | G06K 9/00791 701/28 |
| 2003/0202683 | A1* | 10/2003 | Ma | G08G 1/096716 382/104 |
| 2006/0098874 | A1* | 5/2006 | Lev | G06K 9/228 382/182 |
| 2009/0017765 | A1* | 1/2009 | Lev | G06K 9/228 455/66.1 |
| 2009/0074249 | A1* | 3/2009 | Moed | G06K 9/00818 382/104 |

OTHER PUBLICATIONS

Carpenter, Anne E., et al. "CellProfiler: image analysis software for identifying and quantifying cell phenotypes." Genome biology 7(10) Oct. 31, 2006, 11 pages.

Martinovic, et al., "Real-time Detection and Recognition of Traffic Signs," MIPRO, 2010 Proceedings of the 33rd International Convention, Opatija, Croatia, May 24-28, 2010, pp. 760-765.

"Automated Speed Limit Sign Recognition," Report by Aalborg University, Department of Electronic Systems, Information Processing Systems. Fredrik Bajers Voj 7, 9220 Aalborg, Denmark, Dated: May 28, 2010, 103 pp. Available at: http://www.vip.aau.dk/wp-content/uploads/2011/12/sign.pdf.

"CellProfiler: cell image analysis software," Online User Manual for CellProfiier Software created by Anne E. Carpenter and Thouis R. Jones. Online User Manual available at www.cellprofiler.org. Date unknown. 254 pages.

* cited by examiner

| Scenario (Day/Night) | Day | Day | Night | Day | Day | Day |
|---|---|---|---|---|---|---|
| Original Image (size 64x64) | | | | | | |
| Extracted digit's ROI | | | | | | |
| Enhanced digit's ROI | | | | | | |
| Histogram Equalized & resized to 30x30 | 50 | 60 | 70 | 80 | 80 | 120 |
| Binary size = 30x30 | | | | | | |
| Thinned size = 30x30 | | | | | | |
| First digit resized size = 15x30 | | | | | | |
| Second digit resized size = 15x30 | | | | | | |
| Third digit resized size = 15x30 | | | | | | 1 |

FIGURE 5

COMPUTER IMPLEMENTED SYSTEM AND METHOD FOR EXTRACTING AND RECOGNIZING ALPHANUMERIC CHARACTERS FROM TRAFFIC SIGNS

FIELD OF THE DISCLOSURE

The present disclosure relates to the field of recognizing alphanumeric characters from traffic signs.

BACKGROUND

Growing amount of urban traffic has led to excessive rise in the traffic accident statistics. It is common for drivers to ignore signs, especially the traffic signs displaying speed limits. These signs are provided to insure driving safety and comfort. In order to follow the signs, it is important that the driver is able to recognize the sign and accordingly take necessary measures.

Nowadays, various Advanced Driver Assistance Systems (ADAS) help drivers in the driving process by maintaining both vehicle and road safety. Traffic sign recognition is a component of Advanced Driver Assistance System that helps drivers by communicating information related to the traffic signs. Such systems assist drivers in following traffic rules. Existing traffic sign detection methods use different machine learning techniques. These techniques are computationally complex and require offline training Additionally, in such systems successful digit recognition depends on illumination i.e. on the lighting conditions as well as on the scale of the traffic signs. Moreover, based on these conditions the digits extracted from the traffic signs may be incomplete, thus, resulting in incorrect recognition.

Therefore, there is a need for a system that is independent of the machine learning techniques and which limits the aforementioned drawbacks.

OBJECTS

Some of the objects of the present disclosure aimed to ameliorate one or more problems of the prior art or to at least provide a useful alternative are described herein below:

An object of the present disclosure is to provide a system for extracting and recognizing alphanumeric characters from traffic signs.

Another object of the present disclosure is to provide a system that does not use machine learning techniques for extracting and recognizing alphanumeric characters from traffic signs.

Further object of the present disclosure is to provide a system that is invariant of lighting conditions.

Yet, another object of the present disclosure is to provide a system that is invariant of the scale of the captured image of the traffic sign.

Still, another object of the present disclosure is to provide a system that enhances extracted incomplete digits.

Another object of the present disclosure is to provide a system that recognizes alphanumeric characters using morphological preprocessing.

Other objects and advantages of the present disclosure will be more apparent from the following description when read in conjunction with the accompanying figures, which are not intended to limit the scope of the present disclosure.

SUMMARY

The present disclosure envisages a system for extracting and recognizing alphanumeric characters from traffic signs and displaying the recognized alphanumeric characters on a vehicle's display.

Typically, in accordance with the present disclosure, the system for extracting and recognizing alphanumeric characters from traffic signs and displaying the recognized alphanumeric characters on a vehicle's display, comprises a repository, a camera, a processor, a shape detector, an image enhancing module, an alphanumeric character recognizer and a display. The repository present in the system stores a pre-determined template having sections, alphanumeric characters superimposed on the template and a table. This table contains pre-determined threshold pixel count for each of the sections of the alphanumeric characters superimposed on the template. There is a one to one unique correspondence between these alphanumeric characters and the threshold pixel count. The camera is mounted on a vehicle and configured to capture images of traffic signs. The processor present in the system cooperates with the camera to select analog images of traffic signs suitable for recognition, based on a pre-determined set of rules. These suitable analog images are transmitted to the shape detector which detects, under the commands of the processor, shapes within the suitable analog images to obtain readable images of alphanumeric characters. The image enhancing module cooperates with the shape detector to receive these readable images of alphanumeric characters and configured to improve quality of the images of alphanumeric characters to obtain enhanced readable images. These enhanced readable images are received by the alphanumeric character recognizer to recognize alphanumeric characters from the received enhanced readable images. To recognize the alphanumeric characters, the alphanumeric character recognizer comprises a binary converter, a first resizer, a thinning module, an image cropping module, an alphanumeric character cropping module, a second resizer, a first comparator and a second comparator. The binary converter is configured to convert the received enhanced readable images to digital binary images which are then resized by the first resizer to obtain resized images. Morphological thinning is then applied on these resized images by the thinning module to obtain analog images having thinned alphanumeric characters. The image cropping module then crops these analog images having thinned alphanumeric characters to obtain alphanumeric characters. The alphanumeric character cropping module receives these alphanumeric characters and crops them to obtain separated alphanumeric characters. The second resizer then resizes the separated alphanumeric characters to obtain resized alphanumeric characters. These resized alphanumeric characters are compared with the pre-determined template by the first comparator to obtain number of pixels present in the different sections of the template. The second comparator receives the table containing pre-determined threshold pixel count for each of the sections of the alphanumeric characters superimposed on the template from the repository, and the obtained number of pixels from the first comparator and compares the obtained number of pixels present in particular sections with the received threshold pixel count for that section to recognize corresponding alphanumeric characters. The display then receives these recognized alphanumeric characters and displays them.

In accordance with the present invention, there is provided a computer implemented method for extracting and recognizing alphanumeric characters from traffic signs and displaying the recognized alphanumeric characters on a vehicle's display. The method comprises the following:

storing a pre-determined template having sections, alphanumeric characters superimposed on the template and a table containing pre-determined threshold pixel count for each of the sections of the alphanumeric characters superimposed on the template, wherein there is a one to one unique correspondence between the alphanumeric characters and the threshold pixel count;

capturing images of traffic signs;

selecting analog images of traffic signs suitable for recognition, based on a pre-determined set of rules;

detecting shapes within the suitable analog images to obtain readable images of alphanumeric characters;

enhancing quality of the images of alphanumeric characters to obtain enhanced readable images;

recognizing alphanumeric characters from the obtained enhanced readable images, the step of recognizing alphanumeric characters comprises:

converting the received enhanced readable images to digital binary images;

resizing the digital binary images to obtain resized images;

applying morphological thinning on the obtained resized images to obtain analog images having thinned alphanumeric characters;

cropping the analog images having thinned alphanumeric characters to obtain alphanumeric characters;

separating alphanumeric characters by cropping;

resizing the separated alphanumeric characters to obtain resized alphanumeric characters;

comparing each of the resized alphanumeric characters with the stored pre-determined template to obtain number of pixels present in the different sections of the template;

comparing the obtained number of pixels present in particular sections with the total threshold pixel count for that section stored in the repository to recognize corresponding alphanumeric characters; and displaying the recognized alphanumeric characters.

BRIEF DESCRIPTION OF ACCOMPANYING DRAWINGS

A computer implemented system for extracting and recognizing alphanumeric characters from traffic signs of the present disclosure will now be described with the help of accompanying drawings, in which.

DETAILED DESCRIPTION

A preferred embodiment of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The system of the present disclosure extracts and recognizes alphanumeric characters from traffic signs. A camera present in the system is mounted on the vehicle for capturing images of traffic signs. The system then gives a region of interest (ROI) within the frame of the captured image, from where the alphanumeric characters are extracted and enhanced for recognition. For this system, the region of interest is defined by the borders of the alphanumeric characters within the captured image of traffic signs. Once the ROI is identified the alphanumeric characters are extracted and enhanced. For recognizing the enhanced alphanumeric characters, the image is converted to binary image and morphological thinning technique is applied on it. The space then obtained between two alphanumeric characters helps in extracting the characters and recognizing them independently from the captured image. Each extracted alphanumeric character is re-sized to a specified size and is recognized with the help of white pixels count.

Figure 1:
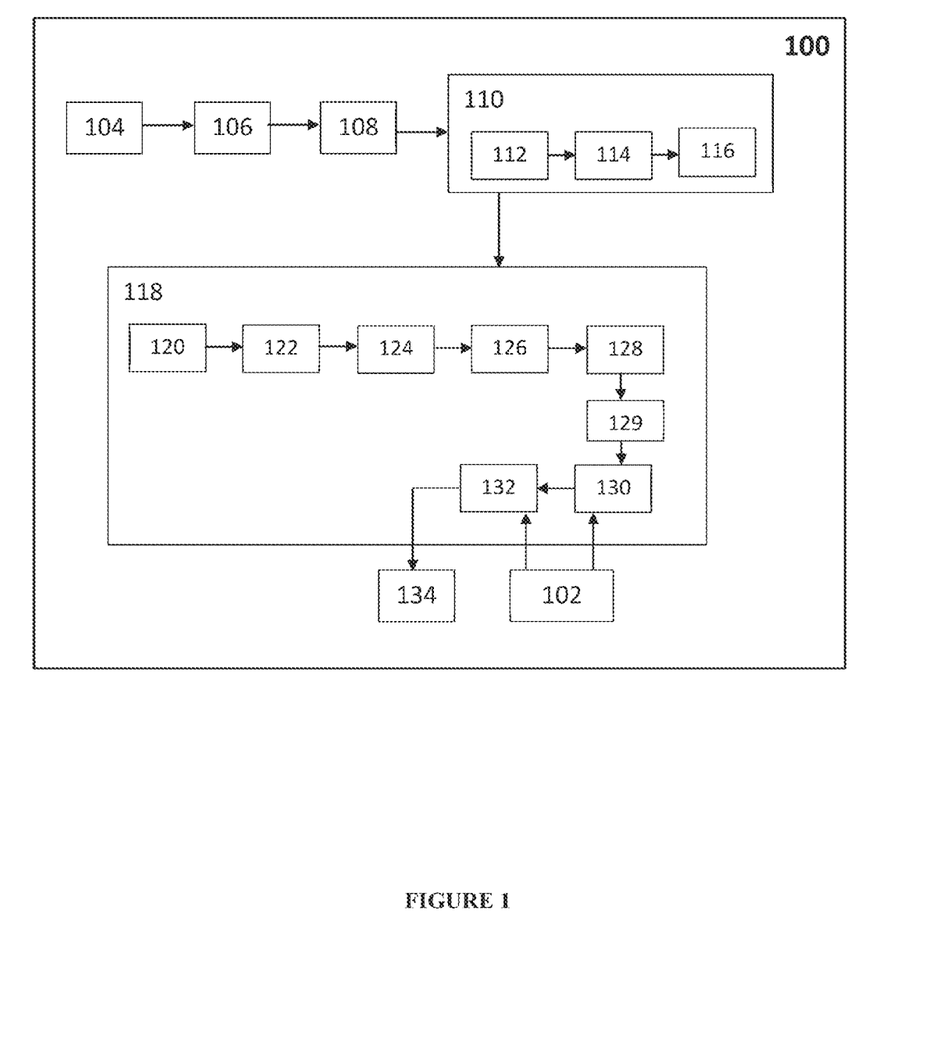
FIG. 1 illustrates a schematic of an exemplary embodiment of the system for extracting and recognizing alphanumeric characters from traffic signs.
Figure 2:
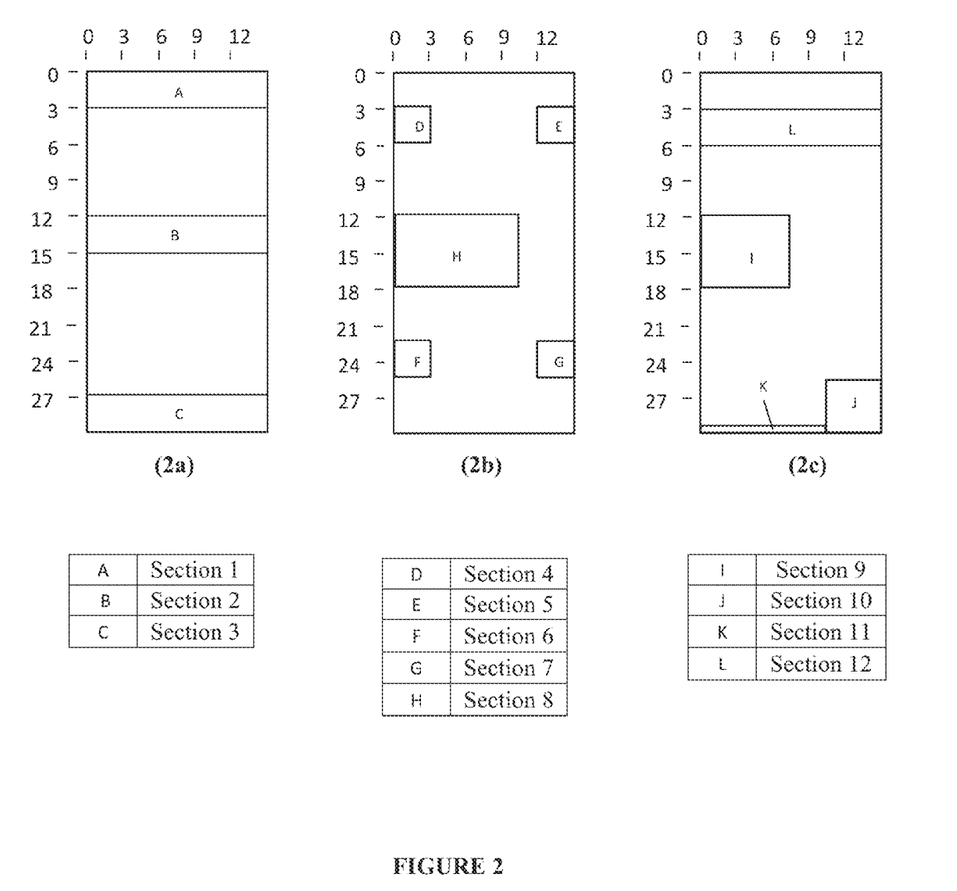
FIG. 2 illustrates an exemplary embodiment of a 15×30 template consisting 12 sections as illustrated in 2a, 2b and 2c.

Referring to the accompanying drawings, FIG. 1 illustrates the schematic of an exemplary embodiment of the system for extracting and recognizing alphanumeric characters from traffic signs and displaying the extracted sign for the benefit of the driver. The system 100 extracts and recognizes alphanumeric characters from traffic signs and displays the recognized alphanumeric characters on a display 134. The display 134 can be a vehicle's dashboard or any other display which is adapted to be mounted in the vehicle such that it provides a clear image of the recognized alphanumeric characters to the driver. The system 100 comprises a repository 102 which stores a pre-determined template having sections, alphanumeric characters superimposed on the template and a table containing pre-determined threshold pixel count for each of the of the alphanumeric characters superimposed on the template, wherein there is a one to one unique correspondence between the alphanumeric characters and the total threshold pixel count. In the accompanying drawings, FIG. 2 illustrates an exemplary embodiment of a 15×30 template consisting 12 sections illustrated in FIGS. 2*a*, 2*b* and 2*c*. In an embodiment, the repository 102 stores this template and a table containing the threshold pixel count for each of section and corresponding alphanumeric characters based on total threshold pixel count within multiple sections.

The system 100 comprises a camera 104 which is adapted to be mounted on a vehicle for capturing images of signs along the side of roads. Once these signs are captured by the camera 104 these analog images are processed by a processor 106 present in the system 100. Suitable analog images are then selected by the processor 106 based on a pre-determined set of rules. A shape detector 108 present in the system 100 receives the suitable analog images from the processor 106 and detects shapes present within the suitable analog images by identifying region of interest to obtain readable images of alphanumeric characters. For example, if a suitable analog image is an image of a speed limit sign having numeric characters placed in a circle, the shape detector detects the circle and obtains an image of the numeric characters which denote the speed limit. Thus, the shape detector detects various shapes including circle, triangle, elliptical, rectangle etc. to obtain readable images of alphanumeric characters. It may happen that the obtained readable image includes incomplete information related to the alphanumeric characters, which may lead to wrong classification. To avoid this, an image enhancing module 110 is incorporated in the system 100. The image enhancing module 110 cooperates with the shape detector 108 to receive the readable images of alphanumeric characters and enhances the quality of the images of alphanumeric characters to obtain enhanced readable images. To obtain the enhanced readable images, the image enhancing module 110 comprises an ROI identifier 112 that crops the readable image of alphanumeric characters by identifying an area of an image corresponding to region of interest for each of the readable image of alphanumeric characters. This cropped image is then converted into a gray image by an ROI converter 114 present in the image enhancing module 110. The enhancing module 110 also includes a histogram equalizer 116 that receives the gray image and applies histogram equalization on gray image to obtain enhanced readable image. Histogram equalization provides contrast adjustment using an image's histogram, which provides better distribution of intensities of the alphanumeric characters within the image on the histogram. This allows for areas of lower local contrast to gain a higher contrast. In one embodiment, the enhanced readable analog image comprises image of black alphanumeric characters on a white image background. The enhanced readable image is then received by an alphanumeric character recognizer 118 included in the system 100. The alphanumeric character recognizer 118 recognizes alphanumeric characters from the received enhanced readable images. To recognize the alphanumeric characters, the alphanumeric character recognizer 118 includes a binary converter 120, a first resizer 122, a thinning module 124, an image cropping module 126, an alphanumeric character cropping module 128, a second resizer 129, a first comparator 130 and a second comparator 132. The binary converter 120 converts the received enhanced readable images to digital binary images. In one embodiment, the digital binary images include image of white alphanumeric characters on a black image background. The digital binary images are then resized to a suitable size by the first resizer 122. The thinning module 124 applies morphological thinning on these resized images to obtain analog images having thinned alphanumeric characters which are then cropped by the image cropping module 126 to obtain alphanumeric characters. The alphanumeric character cropping module 128 again crops the image of obtained alphanumeric characters to obtain separated alphanumeric characters. These separated alphanumeric characters are then resized to a suitable size by the second resizer 129 to obtain resized alphanumeric characters. The resized alphanumeric characters are then compared by the first comparator 130 with the predetermined template stored in the repository 102 to obtain number of pixels present in the different sections of the template. The second comparator 132 cooperates with the repository 102 to receive the table containing pre-determined threshold pixel count for each of the sections of the alphanumeric characters superimposed on the template, and also cooperates with the first comparator 130 to receive the obtained number of pixels. The second comparator 132 then compares the obtained number of pixels present in particular sections with the received stored threshold pixel count for that section to recognize corresponding alphanumeric characters. These recognized alphanumeric characters are then displayed on the display 134.

Referring to the accompanying drawings, FIG. 2 illustrates an exemplary embodiment of a 15×30 template consisting 12 sections. 2a, 2b and 2c illustrate different sections on one template where A, B, C, D, F, G, H, I, J, K, L are the different sections. In one embodiment, white pixels present in each of these sections are used to recognize the extracted alphanumeric character.

Figure 3:
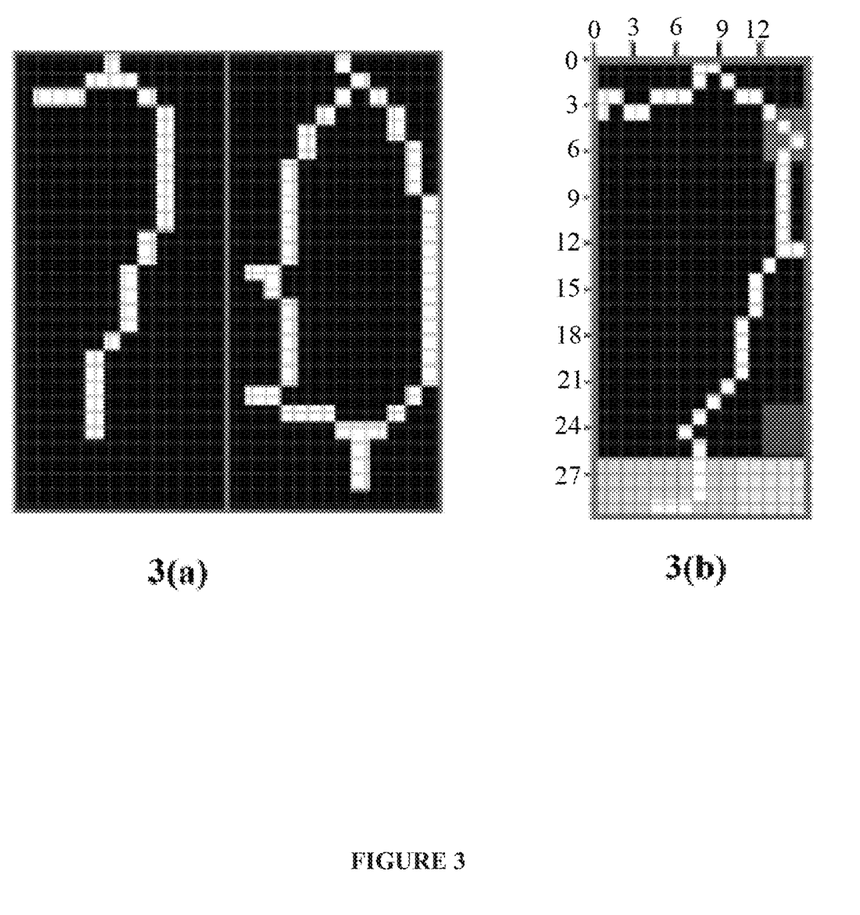
FIG. 3 illustrates an exemplary embodiment where 3a shows the partition obtained between two digits of thinned image and 3b shows first digit of the thinned, resized image and sections for determining the alphanumeric character from the thinned image.

Referring to the accompanying drawings, FIG. 3 illustrates an exemplary embodiment where 3a shows the partition between two digits of thinned image and 3b shows first digit of the thinned, resized image and sections for determining the alphanumeric character. In this figure, 3a illustrates an image obtained after binary conversion and morphological thinning The alphanumeric characters are separated due to morphological thinning These separated characters are resized to fit the predetermined template and are then placed on the template to identify white pixel present in each of the sections of the template. Based on the number of the white pixels of the character in particular section, the character is recognized and displayed. 3b shows different sections of the template where the white pixels of the thinned digit are present.

Figure 4:
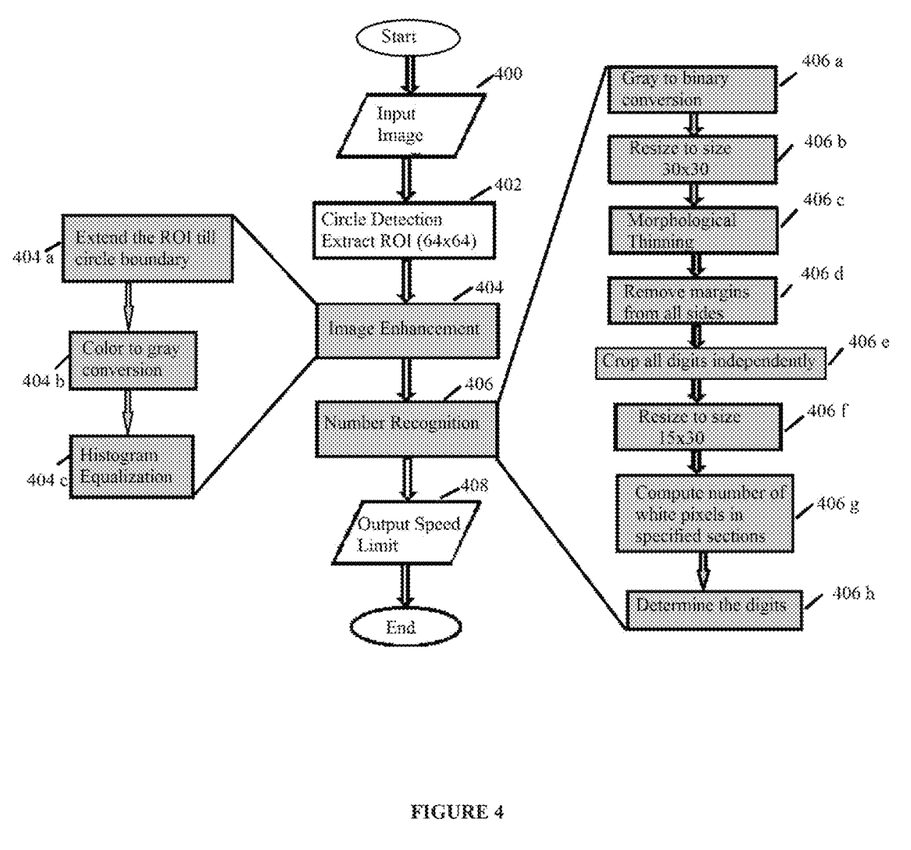
FIG. 4 illustrates an exemplary flow diagram of morphological based character extraction and recognition.

Referring to the accompanying drawings, FIG. 4 illustrates a flow diagram of and exemplary embodiment that uses morphological based character extraction and recognition. This embodiment considers a traffic sign displaying speed limit as an input image 400. In this embodiment, the traffic sign includes digits placed inside a circle. Once the image is captured, the shape detector present in the system detects the circle and extracts image (64×64 in this embodiment) within the circle 402. This provides the digit's ROI in the frame. Sometimes this extracted digit may be incomplete (i.e. portions of the digits may be missing). To avoid wrong classification due to this, image enhancement 404 is required to complete the digit. For image enhancement the region of interest (ROI) of the extracted digit's image is extended horizontally and vertically, until the region is inside the circle boundary 404a. This colored ROI image is then converted to gray image 404b and histogram equalization is applied 404c on this gray image such that digits are black and background is white. The obtained image is then transmitted to the alphanumeric character recognizer for number recognition 406. Morphology based digit recognition is used for digit recognition. The alphanumeric character recognizer converts the gray image to binary image 406a such that digits are white and background is black. It then re-sizes the binary image to a suitable size (30×30 in this embodiment) 406b and applies morphological thinning 406c on the re-sized binary image. The image is then cropped from all four sides 406d, so that only the digit is obtained. All digits from the thinned image are then cropped independently 406e, based on gap between the digits. If the gap is absent, this process is stopped and the image is discarded as it is not suitable for recognition and another image is captured. Once the images of separated digits are obtained based on the gap, the digits are resized to a suitable size (15×30 in this embodiment) 406f. A template is already defined having 12 different sections in the 15×30 image (as illustrated in FIG. 2). The system then computes the number of white pixels in each specified section 406g of the digit re-sized image and the digits are recognized/determined 406h based on the number of white pixels in specified sections. These recognized digits provide the speed limit 408 displayed on the traffic sign. For example, for recognizing digit 7, white pixel count in section 3, 5, 7 and section 10 are used, as illustrated in FIG. 3b.

The system envisaged in the present disclosure captures images of the traffic signs and extracts alphanumeric characters from the traffic signs to recognize and display the alphanumeric characters present in the traffic signs. This system is not dependent on the scale of the captured images and the lighting conditions. In an embodiment, the system recognizes the alphanumeric characters by comparing white pixels, obtained by processing the captured image, with the threshold white pixel count, and provides a best fit alphanumeric character based on this comparison.

Figure 5:
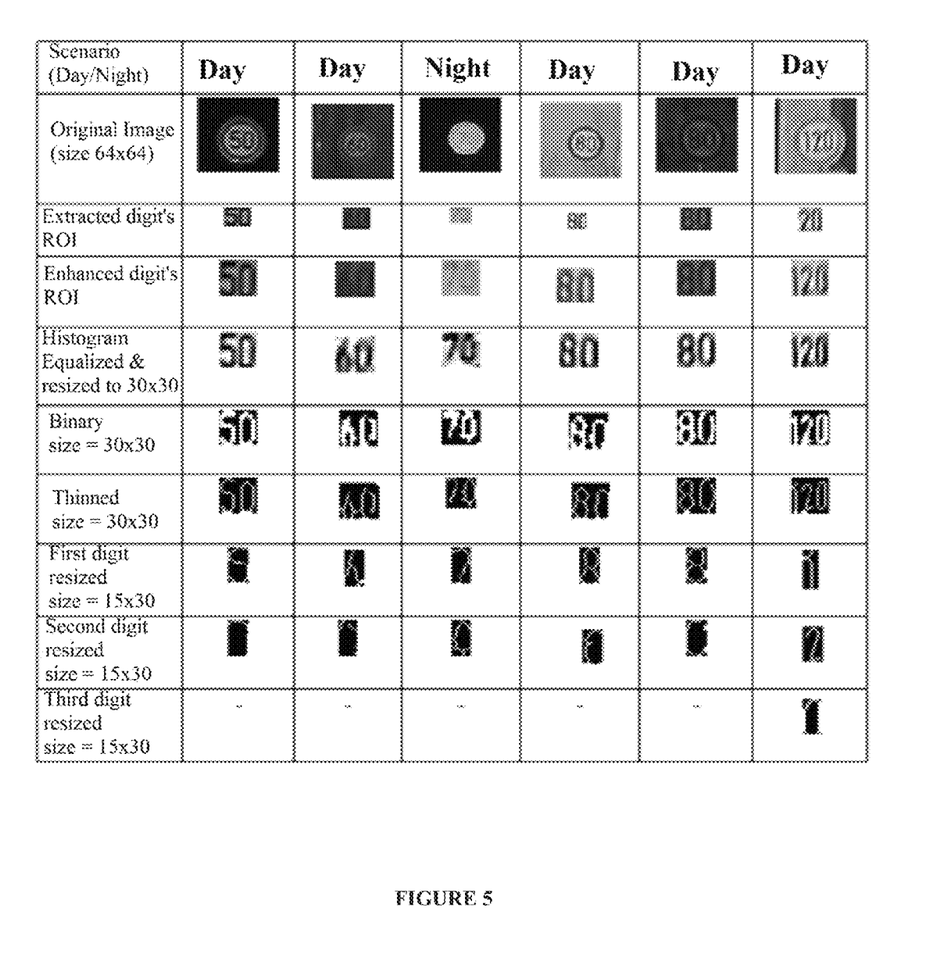
FIG. 5 illustrates an embodiment of multiple images of traffic signs (speed limit signs) having digits placed inside circles, and images obtained at different steps during the method of extraction and recognition of the digits.

Referring to the accompanying drawings, FIG. 5 illustrates an embodiment of multiple images of traffic signs (speed limit signs) having digits place inside circles, and images obtained at different steps during the method of extraction and recognition of the digits. Images of these speed limit signs are captured during day and night to correctly extract and recognize the digits within the images so as to envisage a system which is invariant of the scale of the captured images, colors within the images and the lighting conditions in which the images are captured.

In one embodiment, the images of rectangular traffic signs are captured and processed to detect the rectangular shape of the traffic sign and identify region of interest within the detected shape in order to obtain readable images of alphanumeric characters.

The system envisaged by the present disclosure extracts and recognizes alphanumeric characters from images of traffic signs having various shapes including circle, triangle, elliptical, rectangle and the like.

TECHNICAL ADVANCEMENTS

The technical advancements offered by the present disclosure include the realization of:
 a system for extracting and recognizing alphanumeric characters from traffic signs;
 a system that does not use machine learning techniques for extracting and recognizing alphanumeric characters from traffic signs;
 a system that is invariant of lighting conditions;
 a system that is invariant of the scale of the captured image of the traffic sign;
 a system that enhances extracted incomplete digits; and
 a system that recognizes alphanumeric characters using morphological preprocessing.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

We claim:

1. A computer implemented system having (i) a repository to store a pre-determined template having sections and alphanumeric characters superimposed on the template, (ii) a camera to capture images of traffic signs, (iii) a processor to select analog images from captured images of traffic signs, (iv) a shape detector to detect shapes within the suitable analog images to obtain readable images of alphanumeric characters, (v) an image enhancing module to enhance the quality of the images of alphanumeric characters, and (vi) an alphanumeric character recognizer to recognize alphanumeric characters from the received enhanced readable images, for extracting and recognizing alphanumeric characters from traffic signs and displaying the recognized alphanumeric characters on a vehicle's display, said alphanumeric character recognizer comprising:

a binary converter configured to convert the received enhanced readable images to digital binary images;
a first resizer cooperating with the binary converter and configured to resize the digital binary images to obtain resized images;
a thinning module cooperating with the first resizer to receive the resized images and configured to apply morphological thinning on the received resized images to obtain analog images having thinned alphanumeric characters;
an image cropping module cooperating with the thinning module and configured to crop the analog images having thinned alphanumeric characters to obtain alphanumeric characters;
an alphanumeric character cropping module cooperating with the image cropping module to receive the cropped images having the alphanumeric characters and configured to obtain separated alphanumeric characters;
a second resizer cooperating with the alphanumeric character cropping module and configured to resize the separated alphanumeric characters to obtain resized alphanumeric characters;
a first comparator cooperating with the repository to receive the pre-determined template and the second resizer to receive the resized alphanumeric characters, and configured to compare each of the resized alphanumeric characters with the pre-determined template to obtain number of pixels present in the different sections of the template; and
a second comparator cooperating with the repository to receive the table containing pre-determined threshold pixel count for each of the sections of the alphanumeric characters superimposed on the template, and cooperating with the first comparator to receive the obtained number of pixels and compare the obtained number of pixels present in particular sections with the received threshold pixel count for that section to recognize corresponding alphanumeric characters.

2. The system as claimed in claim 1, wherein said image enhancing module comprises:

an ROI identifier configured to identify an area of an image corresponding to region of interest for each of the readable image of alphanumeric characters to obtain a cropped image;
an ROI converter cooperating with the ROI identifier and configured to convert the cropped image to a gray image; and
a histogram equalizer cooperating with the ROI converter to receive the gray image and configured to apply histogram equalization on the gray image to obtain an enhanced readable analog image.

3. The system as claimed in claim 2, wherein said enhanced readable analog image comprises image of black alphanumeric characters on a white image background.

4. The system as claimed in claim 1, wherein said shape detector obtains readable images of alphanumeric characters by identifying region of interest within the suitable analog images.

5. The system as claimed in claim 1, wherein said display is adapted to be mounted on a vehicle's dashboard.

6. The system as claimed in claim 1, wherein said digital binary images include image of white alphanumeric characters on a black image background.

7. A computer implemented method for extracting and recognizing alphanumeric characters from traffic signs and displaying the recognized alphanumeric characters on a vehicle's display by the steps of: (i) storing a pre-determined template having sections and alphanumeric characters superimposed on the template, (ii) capturing images of traffic signs, (iii) selecting analog images from captured images of traffic signs, (iv) detecting shapes within the suitable analog images to obtain readable images of alphanumeric characters, (v) enhancing the quality of the images of alphanumeric characters, and (vi) recognizing alphanumeric characters from the received enhanced readable images, said step of recognizing alphanumeric characters comprising the following steps:

converting the received enhanced readable images to digital binary images;

resizing the digital binary images to obtain resized images;

applying morphological thinning on the obtained resized images to obtain analog images having thinned alphanumeric characters;

cropping the analog images having thinned alphanumeric characters to obtain alphanumeric characters;

separating alphanumeric characters by cropping;

resizing the separated alphanumeric characters to obtain resized alphanumeric characters;

comparing each of the resized alphanumeric characters with the stored pre-determined template to obtain number of pixels present in the different sections of the template; and comparing the obtained number of pixels present in particular sections with the threshold pixel count for that section stored in said repository to recognize corresponding alphanumeric characters.

8. The method as claimed in claim 7, wherein said step of enhancing quality of the images includes the following:

identifying an area of an image corresponding to region of interest for each of the readable image of alphanumeric characters to obtain a cropped image;

converting the cropped image to a gray image; and applying histogram equalization on said gray image to obtain an enhanced readable analog image.

9. The method as claimed in claim 8, wherein said step of obtaining enhanced readable analog image comprises the step of obtaining image of black alphanumeric characters on a white image background.

10. The method as claimed in claim 7, wherein said step of detecting shapes of alphanumeric characters includes the step of identifying region of interest within the suitable analog images.

11. The method as claimed in claim 7, wherein said step of displaying the recognized alphanumeric characters includes the step of displaying the recognized alphanumeric characters on a vehicle's dashboard.

12. The method as claimed in claim 7, wherein said step of converting the received enhanced readable images to digital binary images comprises the step of obtaining image of white alphanumeric characters on a black image background.

* * * * *